July 7, 1936.  R. E. ZERUNEITH  2,047,160
SOUND REPRODUCING MACHINE
Filed March 30, 1928   9 Sheets-Sheet 1

Inventor
Rudolf E. Zeruneith
By
Cameron, Kirkham & Sutton
Attorneys

July 7, 1936.  R. E. ZERUNEITH  2,047,160
SOUND REPRODUCING MACHINE
Filed March 30, 1928   9 Sheets-Sheet 2

Rudolf E. Zeruneith  Inventor

By Cameron, Kerkam & Sutton.
Attorneys

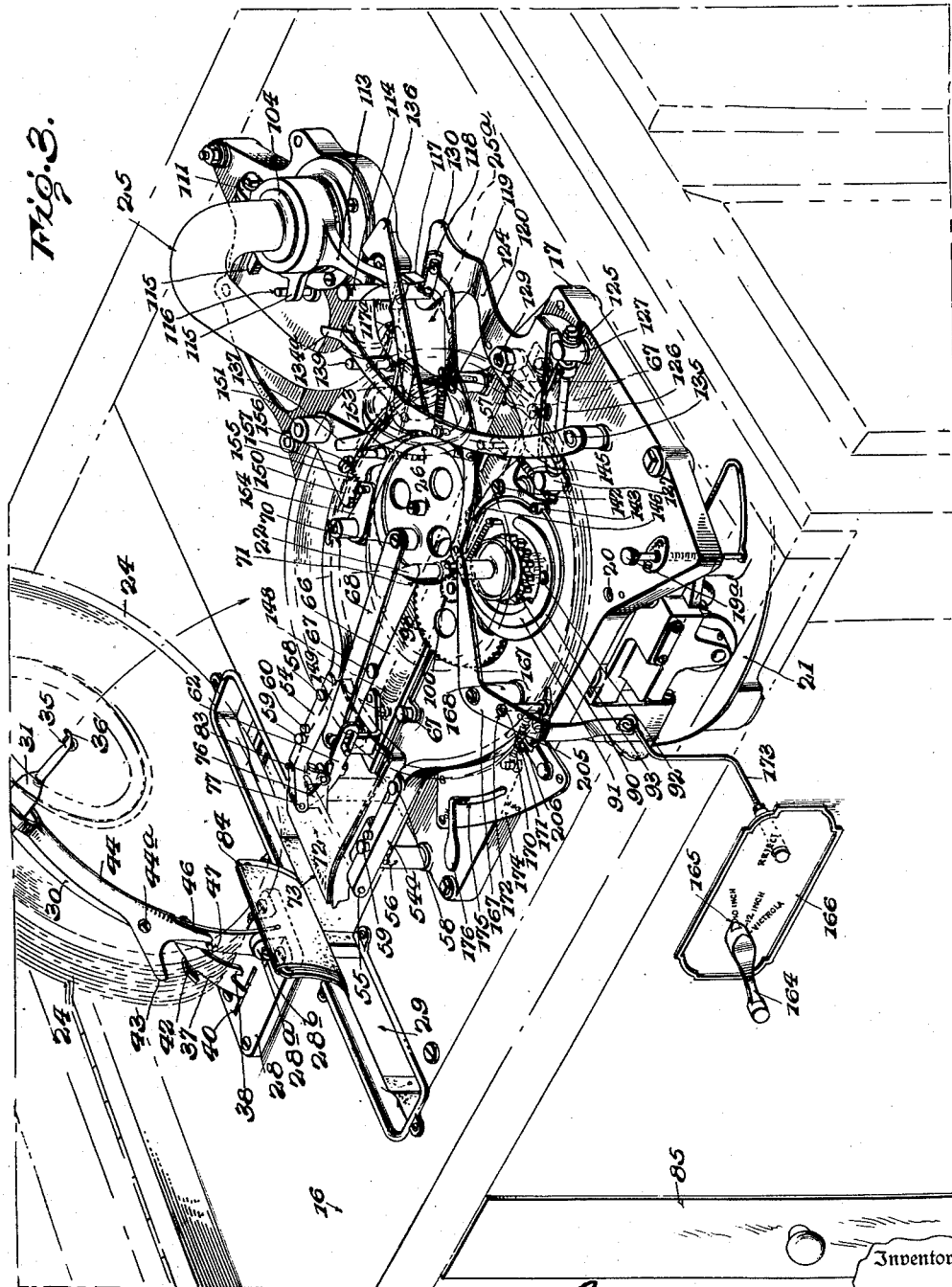

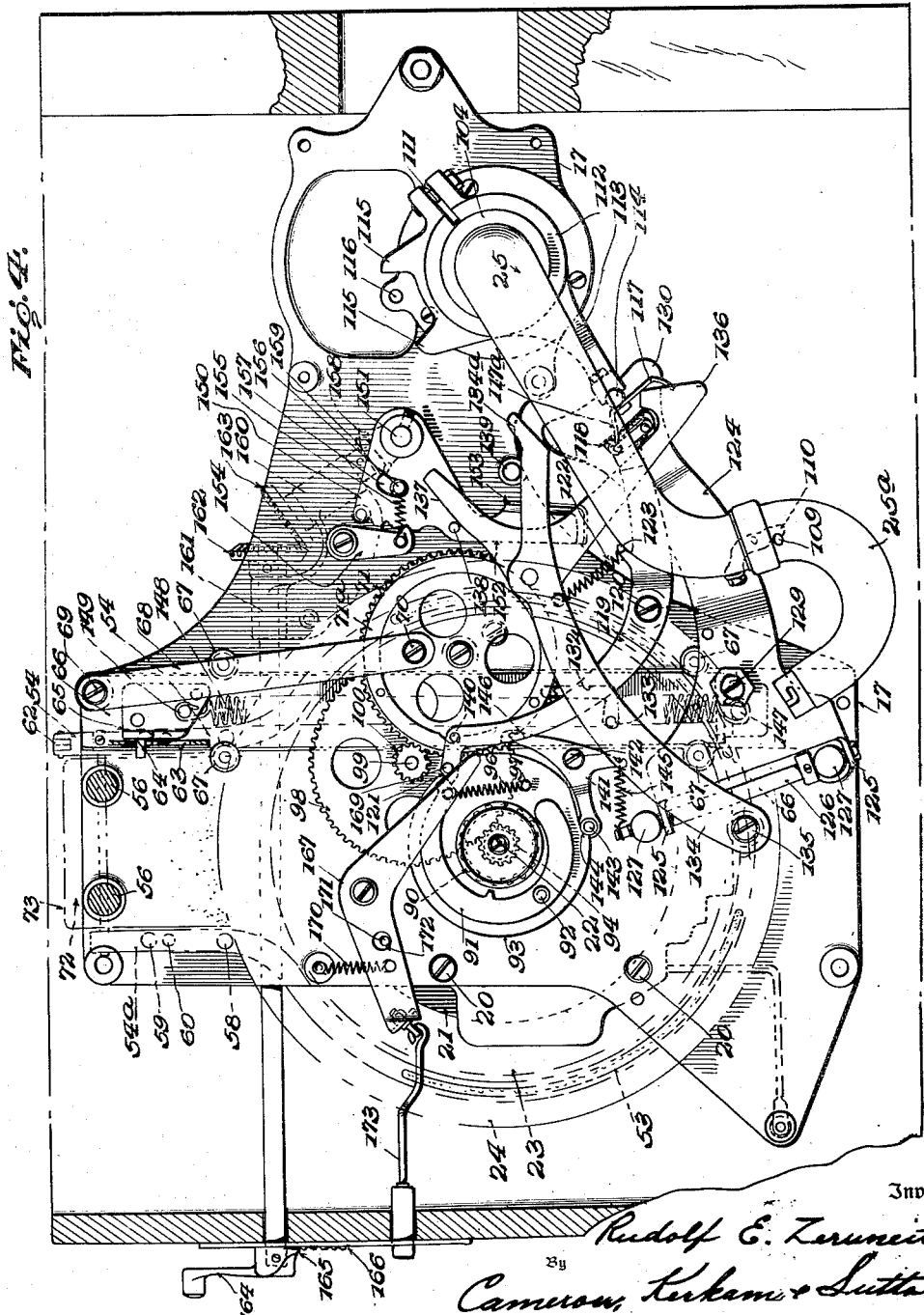

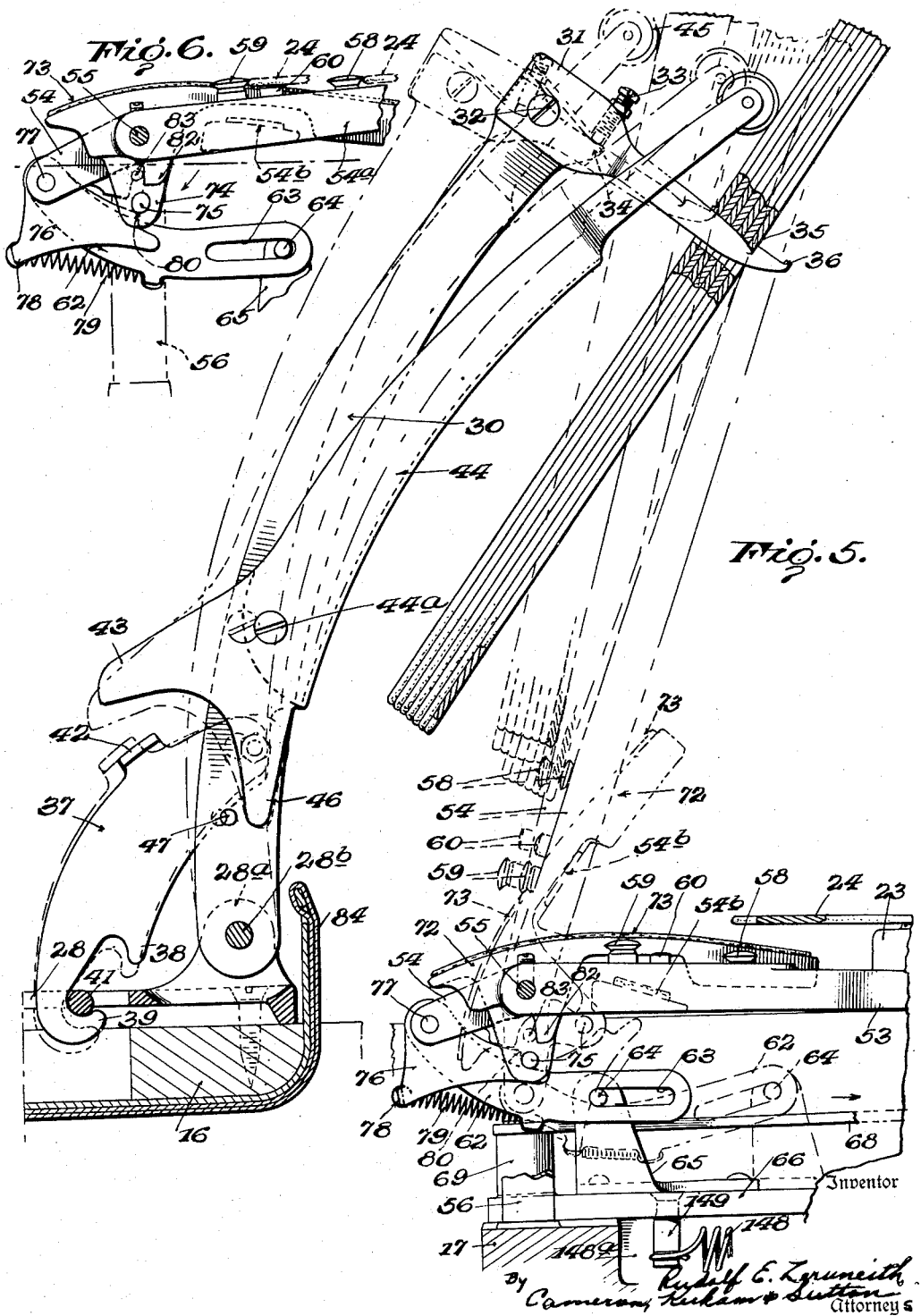

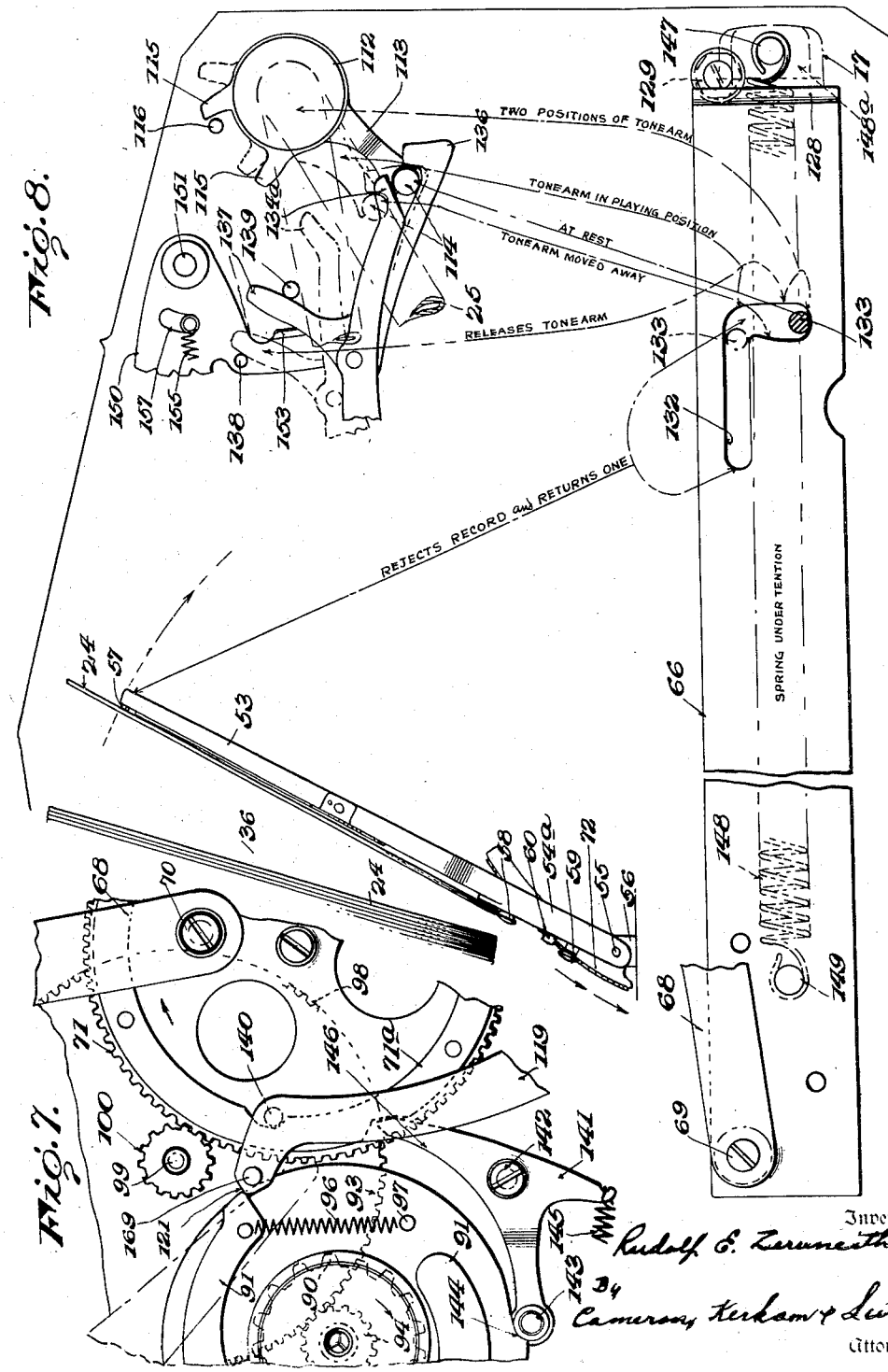

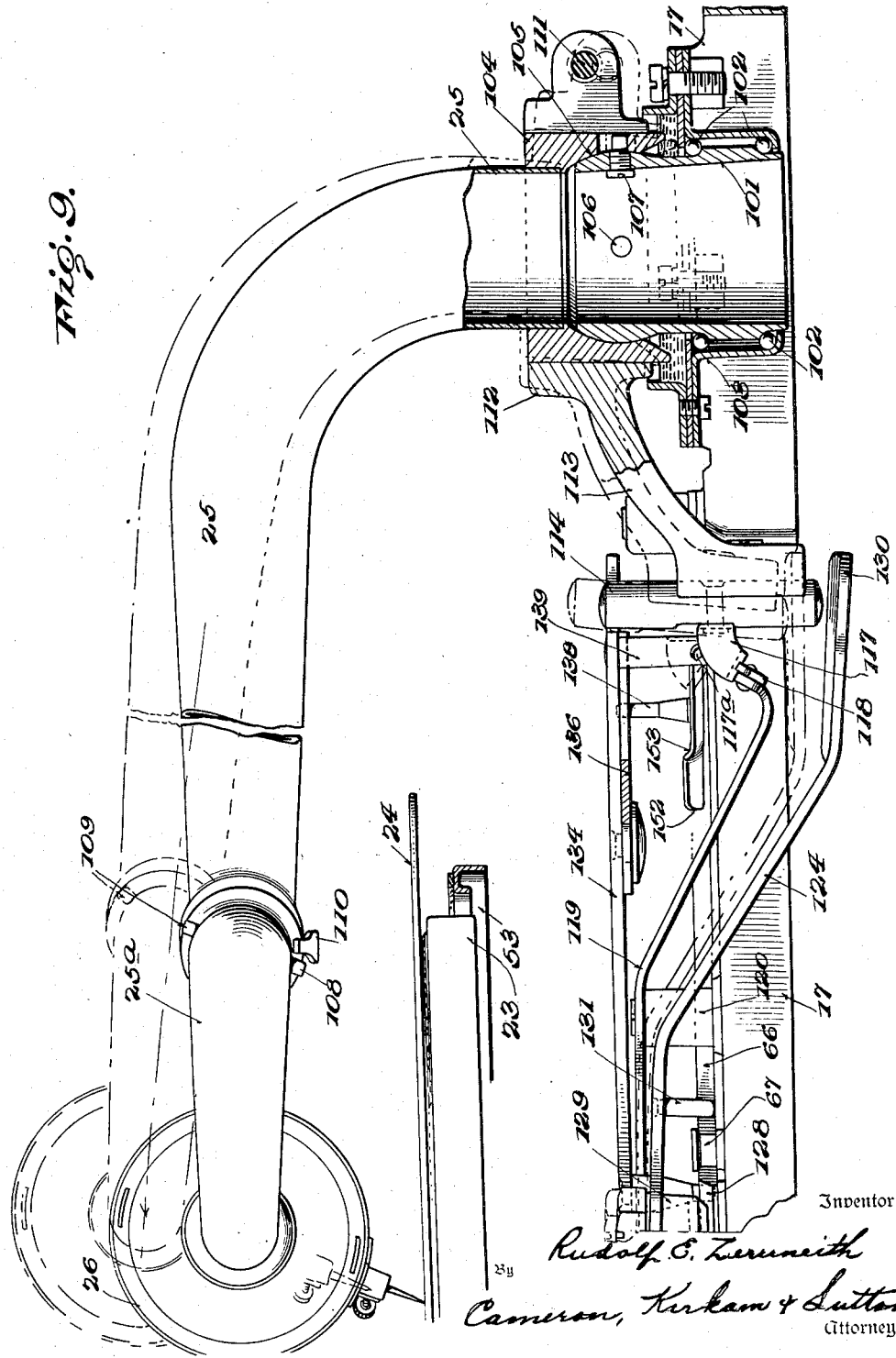

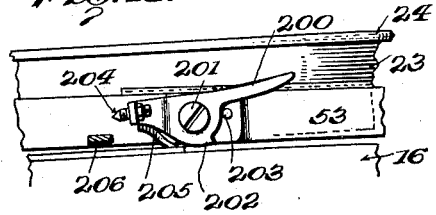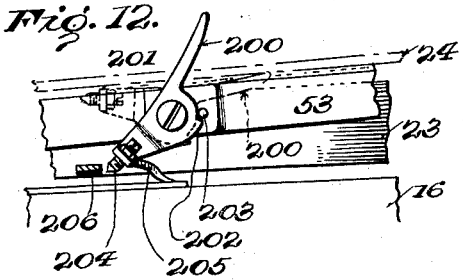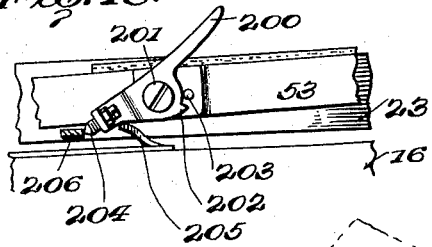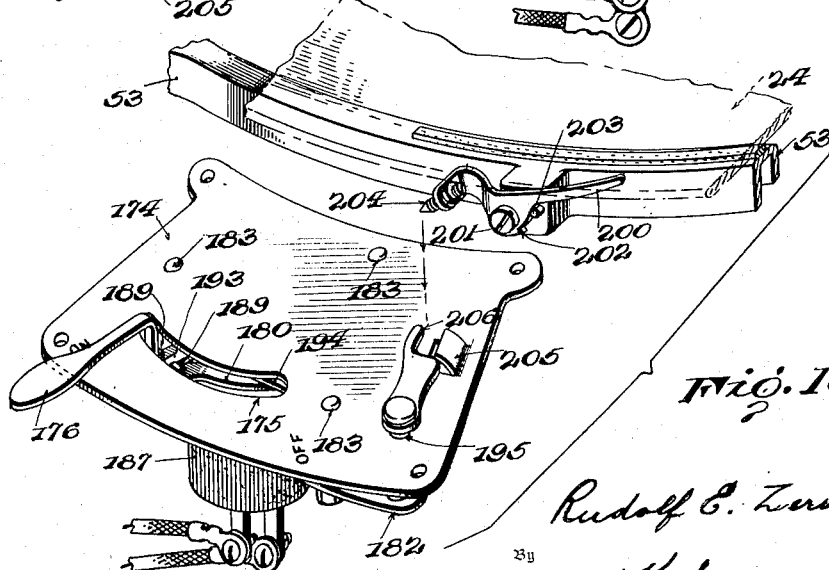

July 7, 1936.  R. E. ZERUNEITH  2,047,160
SOUND REPRODUCING MACHINE
Filed March 30, 1928  9 Sheets-Sheet 9
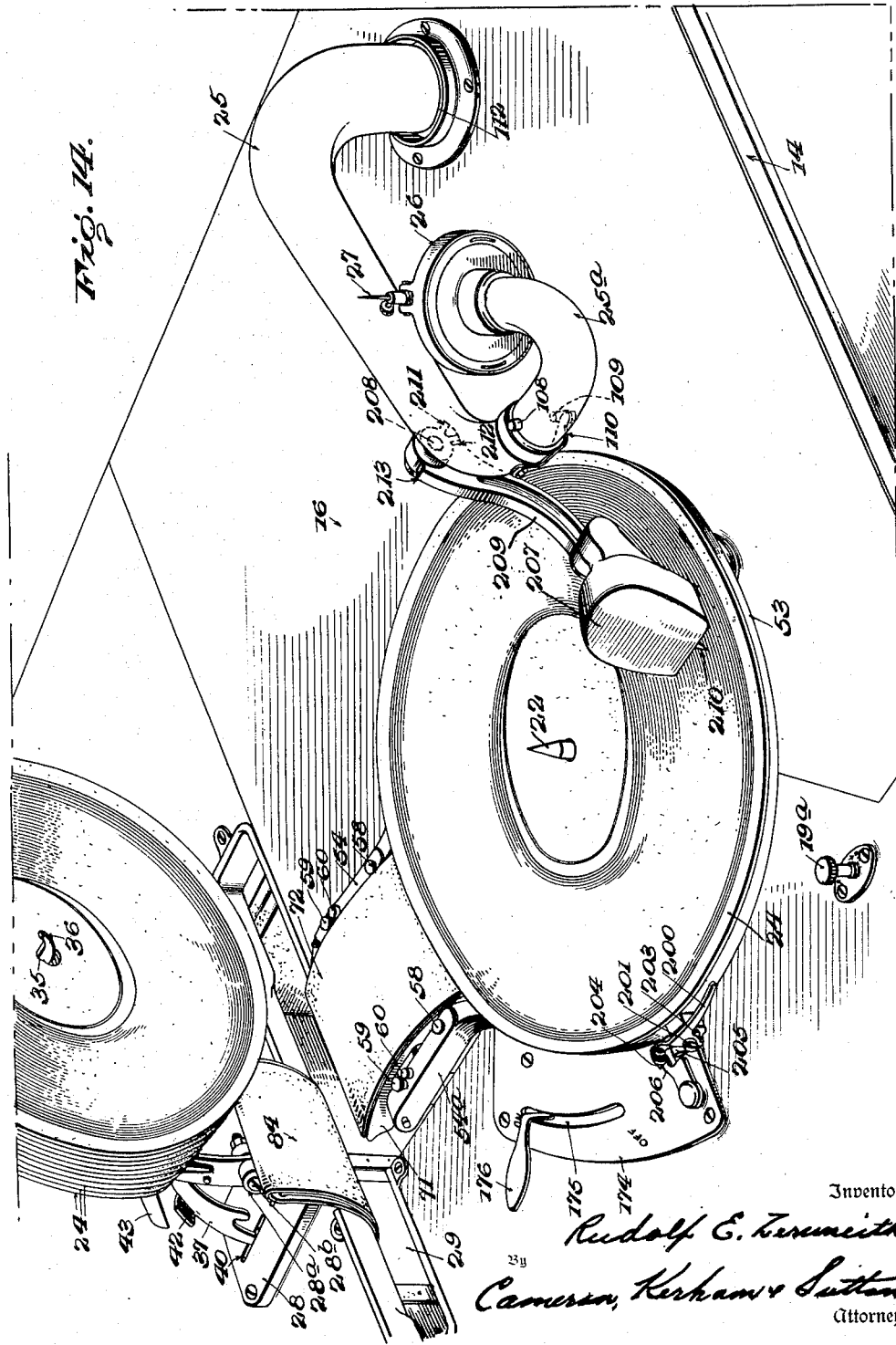

Patented July 7, 1936

2,047,160

UNITED STATES PATENT OFFICE 2,047,160

SOUND REPRODUCING MACHINE

Rudolf Ejnar Zeruneith, West Collingswood, N. J., assignor, by mesne assignments, to Radio Corporation of America, New York, N. Y., a corporation of Delaware Application March 30, 1928, Serial No. 266,060

33 Claims. (Cl. 274—10)

This invention relates to sound reproducing machines, and more particularly to magazine talking machines of the type adapted to reproduce sound from disk record tablets.

It is an object of the present invention to provide a magazine sound reproducing machine of novel, simplified and compact construction, and one which is positive in action whereby a plurality of disk record tablets may be automatically played in succession. Another object is to provide a magazine machine for reproducing record tablets electrically or mechanically, as desired. Many other objects, including the provision of novel operating elements and means, for machines of this character will appear more fully hereafter in the detailed description.

The invention is capable of receiving a variety of mechanical expressions, only two of which are shown on the accompanying drawings, but it is to be expressly understood that the drawings are for purposes of illustration only and are not to be construed as a definition of the limits of the invention, reference being had to the appended claims for that purpose.

In the drawings, wherein like reference characters refer to like parts throughout the several views—

Fig. 3 is a perspective view of the principal elements of the machine constituting the subject matter of the present invention, the motorboard of the cabinet being removed;

Fig. 4 is a top plan view illustrating the principal elements of the mechanism except the magazine means and the stop means;

Fig. 5 is a detail side elevation, in section, of a portion of the record transfer means and the record holding or magazine means;

Fig. 6 is a detail side elevation of a portion of the record transfer means;

Fig. 7 is a top plan detail view illustrating one form of clutch control means which may be employed;

Fig. 8 is a diagrammatic view of certain details of the structure, including the tone arm control;

Fig. 9 is a side elevation, partly in section, of the tone arm and the control means therefor;

Fig. 10 is a detail perspective view of one form of switch and stop mechanism which may be employed;

Fig. 10a is a side elevation, and Fig. 10b a pulled-out view of the switch mechanism shown in Fig. 10;

Figs. 11, 12 and 13 are detail side views illustrating the operation of the stop mechanism; and Fig. 14 is a perspective view of the machine illustrated in Fig. 1 provided with both electrical and mechanical reproducers.

Figure 1:
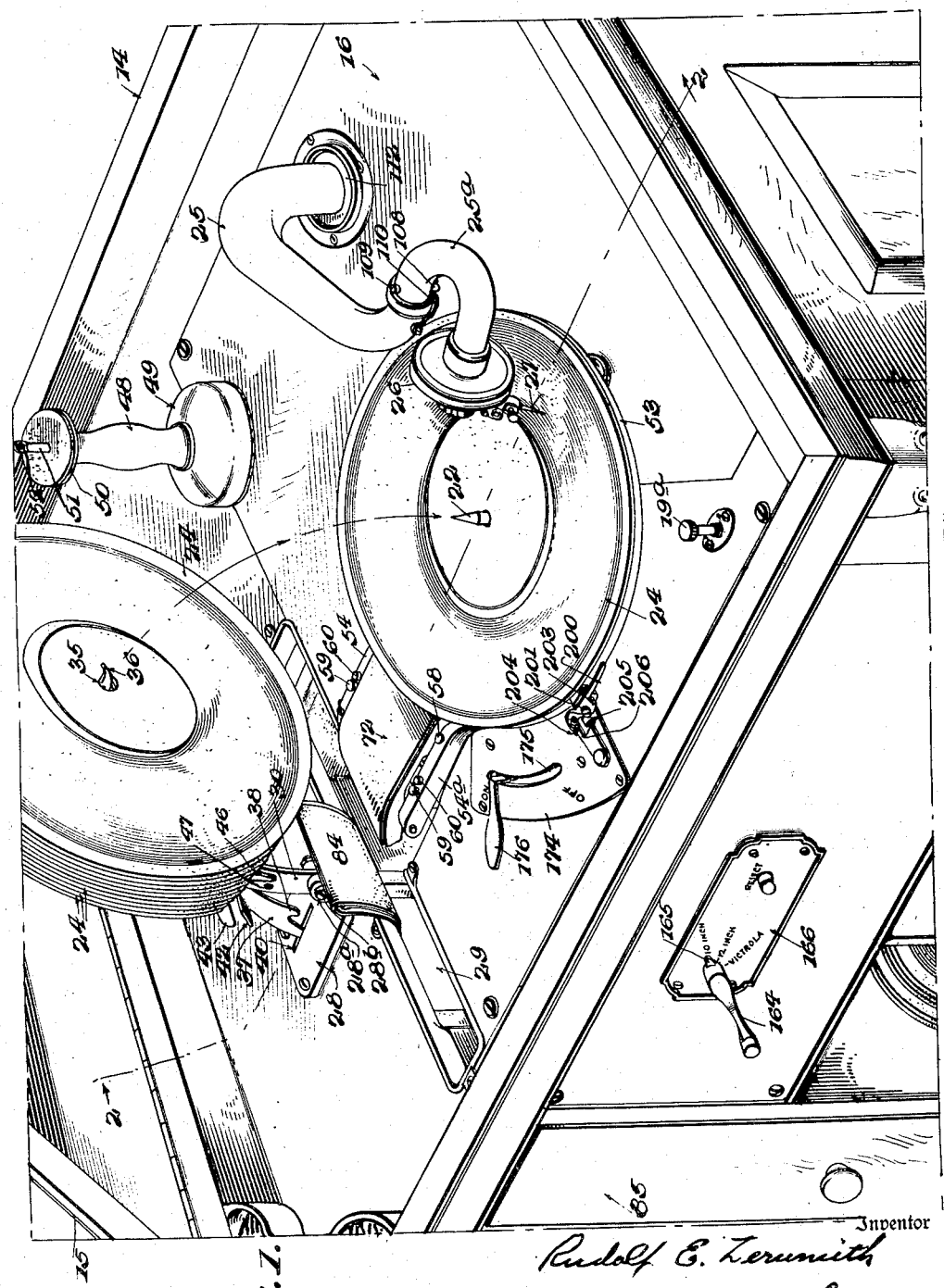
Fig. 1 is a perspective view illustrating the sound reproducing machine of the present invention installed in a cabinet of the upright type, a portion only of the latter being shown.

The present invention embodies sound reproducing means, which are preferably of the type for reproducing disk record tablets, mounted in a suitable cabinet 14, of the upright type, provided with the usual hinged cover 15, a portion only of the cabinet and cover being shown.

A motorboard 16 is provided in the upper portion of the cabinet and below this motorboard and parallel thereto is disposed a motorplate 17 (Fig. 2) which rests on and is attached to suitable ledges or supports 18 provided in the cabinet. The plate 17 constitutes a support for an electric motor 19, the motor being attached to the lower surface of the plate in any suitable manner, as by means of screws or bolts, as at points 20. Speed control means of any suitable type, adapted to be controlled by knob 19a, are provided for the electric motor. In the form illustrated, the motor is of the induction disk type, the disk being shown at 21. It is to be expressly understood, however, that any suitable type of spring or electric motor may be employed for driving the turntable spindle 22 which carries, above the motorboard 16, a turntable 23 adapted to rotate a record tablet 24.

A taper tube or tone arm 25, which is mounted on the motorplate 17 in a manner to be described more fully hereinafter, projects through the motorboard 16 and is provided on the free end thereof with a pivoted gooseneck 25a which supports a sound box 26 carrying a stylus 27 that is adapted to engage the sound groove of the record tablet to be reproduced. The large end of the taper tube 25, which is in communication with a suitable amplifying device or horn (not shown), is pivotally mounted on the motorplate in any suitable manner.

*Record tablet magazine (Figs. 1, 2, 3 and 5).*—
The machine of the present invention embodies novel means for holding a plurality of disk record tablets in position to be transferred one at a time into cooperative relation with the turntable and the sound reproducing instrumentalities constituted by the sound box, taper tube and amplifier. Preferably, the tablet holding means or magazine is so constructed that the tablets are supported at their centers, each tablet bearing against the next adjacent tablet and all having their upper edges inclined, from the vertical, toward the turntable. As will be pointed out more fully hereafter, the magazine is adapted to support record tablets of different diameters.

In the form shown, the magazine mechanism comprises a base plate 28 mounted on the upper surface of the motorboard 16 closely adjacent a slot or opening 29 provided in said board at one side of the turntable 23. The plate 28 is provided with a pair of upstanding ears 28a between which is pivotally mounted, as at 28b, a stand 30 that projects upwardly and carries on its upper, free end a magazine spindle 31.

The spindle 31, which is pivotally connected to stand 30 by a suitable pin 32, carries an adjusting screw 33 adapted to engage a lug or ear 34 provided on the upper end of the stand. By changing the adjustment of screw 33 the angular position of spindle 31 relative to the stand may be varied.

The portion of the spindle 31 that projects from the stand towards the turntable comprises a tubular portion which has a diameter slightly less than the central opening in a record tablet and which terminates in a shoulder 35 located at a short distance from the free end of said spindle. The lower surface of the outer portion of the magazine spindle is cut away or tapered and the end of said portion is provided with an upwardly projecting hook or lug 36.

Pivotally connected to magazine stand 30, at a suitable distance above the ears 28a, is a latch 37 provided adjacent the lower end thereof with a notch, the opposite end walls of the notch constituting a pair of hooks 38 and 39. During the operation of the machine, the latch 37 projects through a suitable slot 40 in plate 28 and normally maintains the stand 30 in inclined position (Fig. 2) since at this time the hook 39 engages a pin 41 carried by plate 28 and extending transversely of slot 40.

The latch 37 is provided on its upper edge with a laterally projecting ear 42 constituting a stop for engaging the lower end 43 of a tilting lever 44 pivoted at 44a to the stand 30 at a point closely adjacent, but above, the pivotal connection for latch 37. The function of the ear 42 is to limit the counter-clockwise movement of the lever 44 relative to the stand 30 whereby to limit the number of records that may be threaded on the spindle 31 and thus prevent overloading the spindle. Preferably, the intermediate portion of lever 44 is U-shaped in cross section, the opposite arms of the same being adapted to slidably engage the opposite faces of the stand 30 to prevent lateral movement of said lever. The upper end of the U-shaped portion of tilting lever 44 is cut away and bent outwardly to form two arms that project above, and on the opposite sides of spindle 31. A roller 45, which is adapted to engage the outer face of a record tablet mounted on spindle 31, is rotatably mounted on the upper ends of the arms of lever 44. The lower end of the lever 44 is provided with a downwardly extending arm 46 adapted to engage a pin 47 that projects from the face of the stand 30, whereby movement of roller 45 in a clockwise direction relative to stand 30 is positively limited. The weight of roller 45 and lever 44, when applied to a tablet, or tablets, mounted on spindle 31, is effective to maintain said tablet or tablets substantially at right angles to the longitudinal axis of said spindle.

In order to facilitate the positioning of a number of record tablets on the magazine spindle, there may be provided a loader (Fig. 1) comprising a handle portion 48, a base 49 and a flange 50, the handle portion being between the base and the flange. A spindle 51, having a diameter slightly less than the diameter of the center opening in a record tablet, projects centrally from the upper face of flange 50 and is provided on its free end with an eye 52. The loader is supported by base 49 in any convenient position, as on the motorboard, with the spindle 51 projecting vertically. Selected record tablets to be played are threaded over the spindle and are supported by flange 50. After the desired number of tablets are positioned on the loader, the operator raises the tablets and loader and engages eye 52 with the hook 36 formed on the free end of magazine spindle 31. At this time, the magazine stand 30 has preferably been moved to the left, as viewed in Figs. 2 or 5, until hook 38 engages pin 41, the stand being supoprted with the free end of magazine spindle 31 slightly above the horizontal. In this position the end 43 of lever 44 engages the ear 42 of the latch 37, and roller 45 and the lower part of the lever 44 define a plane which limits the innermost position on spindle 31 to which a record tablet may be moved, thereby preventing record tablets from sticking on the enlarged inner end of the spindle. By tilting the loader, the record tablets move by gravity from spindle 51 onto the intermediate portion of spindle 31, and the last record tablet positioned on the magazine engages shoulder 35, whereby dislodgement of the tablets from spindle 31 is prevented when the magazine stand is moved to inclined operation position.

After the loader is removed from engagement with spindle 31 and placed clear of the operating parts, stand 30 is moved to the right about the pivot carried by ears 28a until hook 39 engages pin 41, whereupon the record tablets are supported in a position to be transferred to the turntable, one at a time, for reproduction.

When it is desired to discontinue use of the machine, all record tablets that have not been automatically removed from the magazine are manually removed and stand 30 is swung to the left a sufficient distance to disengage latch 37 from pin 41, whereupon the stand and the parts carried thereby may be swung to the right to a substantially horizontal position above the turntable and out of the path of cover 15.

*Record tablet transfer means (Figs. 1 to 6 inclusive, and 8)*.—The machine of the present invention embodies novel means for automatically removing record tablets in succession from the magazine, transferring the tablets into cooperative relation with the sound reproducing instrumentalities, and, after the reproduction or rejection of each record tablet, removing the tablet from the turntable and discharging it through opening 29 into a suitable receptacle. The tablet transfer means is so constructed that it will transfer, to and from the turntable, record tablets of different diameters.

In the form illustrated, the transfer means comprises a lift ring or hoop 53 constituted by a circular portion, which has an inner diameter greater than the outer diameter of the turntable 23, and a pair of substantially parallel arms 54, 54a that project laterally from the circular portion. The ring is not a complete annulus, the arc of the circle between the arms being cut away.

A wedge-shaped strengthening web 54b (Fig. 2) extends between the arms 54, 54a.

The ring 53 is mounted to swing about a horizontal axis through an arc of approximately 90° to transfer record tablets to and from the turntable. For this purpose a pin 55, which extends between and is rigidly attached to arms 54, 54a, is pivotally mounted in a pair of posts 56 which project upwardly from the upper face of motorplate 17 closely adjacent the opening 29 in the motorboard.

Means, adapted to coact with lift ring 53, are provided on arms 54, 54a for removing tablets from the magazine and for retaining the removed tablet on said ring as the latter swings downwardly toward the turntable. In the form shown, said means are constituted by two pairs of upwardly extending posts 58 and 59 (Fig. 3). Posts 58, which are closer to the center of ring 53 than posts 59, are adapted to engage the periphery of record tablets of small size, such as ten-inch records, while posts 59 are adapted to coact with large size records, such as twelve-inch records. As more clearly shown in Fig. 5, the posts are cut away or beveled adjacent the upper ends thereof to receive the edges of the record tablets, and the posts 59 are of greater length than posts 58. Between each of the posts 59 and the adjacent post 58 are lugs 60 which project upwardly from arms 54, 54a a distance substantially equal to the distance that posts 58 extend above said arms. A lug 57 is provided on the upper surface of ring 53, diametrically opposite the arms thereof, for engagement with the lower face of a tablet whereby a small size tablet is maintained in a slightly inclined position, relative to the ring, with its lower edge in the recesses formed in posts 58. Lug 57, posts 58 and lugs 60 support a large size record tablet in such a manner that the edge of the tablet will extend into the recesses formed in posts 59.

Means are provided for swinging the lift hoop 53 from its normal horizontal position surrounding the lower portion of turntable 23 to a substantially upright position to remove a reproduced record tablet from the turntable, and to thereafter engage and remove a record tablet from the magazine, said means being also adapted to return the lift hoop to normal horizontal position to deposit the removed tablet on the turntable in playing position.

As shown more clearly in Figs. 3 and 5, arm 54 is longer than arm 54a and is bifurcated at its outer end to pivotally receive a link 62 which curves downwardly, from its point of attachment with arm 54, and inwardly beneath said arm and parallel thereto. The inner end of link 62 is provided with an elongated slot 63 through which projects a pin 64 carried on the upper end of an ear 65 that is rigidly attached to, or formed integrally with, a slide 66. The slide rests on the upper surface of motorplate 17 and is adapted to be reciprocated thereon, it being guided in this motion by suitable rollers or pins 67 (Fig. 3) which project upwardly from the upper face of plate 17. The elongated slot 63 permits an appreciable movement of pin 64 before the pin is effective to actuate the link and transfer hoop. This is desirable due to the fact that the slide 66 controls the lifting and swinging of the stylus, and these movements must take place prior to the time the transfer hoop begins its upward movement, as will be pointed out more fully hereafter.

Suitable means are provided for reciprocating the slide 66. In the form shown, said means comprise a connecting link 68 which is pivoted to the slide, as at 69 (Fig. 4), closely adjacent the upstanding ear 65. The opposite end of link 68 is pivoted eccentrically, as at 70, to a spur gear 71 rotatably mounted in any suitable manner on the upper surface of plate 17. Gear 71 is driven in a manner to be described hereinafter, whereby slide 66 is reciprocated and the transfer or lift ring 53 is swung about the pivot member 55.

Figure 2:
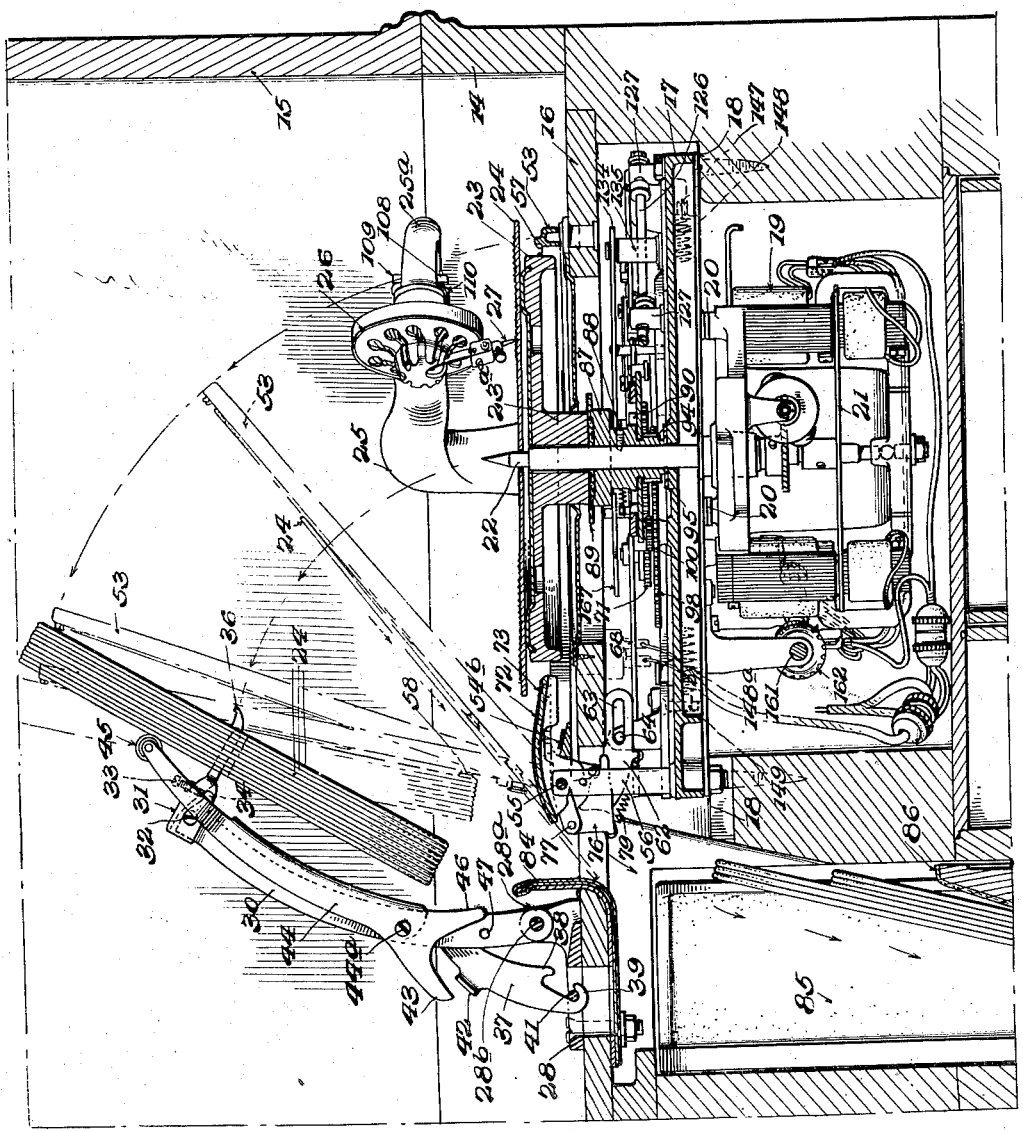
Fig. 2 is a sectional side elevation taken substantially on the line 2—2 of Fig. 1.

Assuming that no record tablet is on the turntable, and the slide is actuated to swing ring 53 upwardly, the lug 57 will be moved into engagement with the face of the outermost tablet mounted on the magazine spindle 31 (Fig. 2). Continued movement of ring 53 results in the tilting of the record tablets (or tablet) about imaginary horizontal axes which pass through the point of engagement of each record tablet with the upper surface of spindle 31, until the record tablets are parallel with the transfer hoop. Further movement of the hoop acts through the tablets to swing stand 30, spindle 31 and roller 45 to the left (as viewed in Figs. 2 and 5), whereupon the spindle and the record tablets carried thereon are moved upwardly relative to transfer hoop 53 (Fig. 5). This upward movement of the record tablets is continued until the lower edge of the outermost record tablet is moved to a point slightly above posts 58, if small sized record tablets are on the magazine, or above posts 59 if the tablets are of large size.

The transfer hoop has now reached the upper limit of its swinging movement and is still slightly inclined from the vertical when the slide 66 begins its return movement toward normal position. The weight of the inclined transfer hoop, roller 45, and the record tablets is now effective to swing said hoop downwardly toward horizontal position as the slide tends to move pin 64 along slot 63. The movement of the hoop, however, maintains the wall of the outer end of slot 63 in engagement with pin 64 so that said movement is controlled and made to conform with the movement of the slide.

As the transfer hoop moves downwardly, the magazine stand and spindle move downwardly toward normal position, thereby lowering all of the record tablets. The outermost record tablet, which is in engagement with the hoop, moves downwardly until its lower edge engages posts 58, or posts 59 in the case of large size tablets, whereupon relative movement between the hoop and said outer tablet is prevented. The outer record tablet is swung by the transfer hoop in an arcuate path such that the cut-away portion of spindle 31 slides along the lower side of the wall of the center opening in the record tablet, this opening being of such size that the record tablet, in its downward movement, clears shoulder 35 and ear 36. Simultaneously, stand 30 and spindle 31 come to rest in their normal inclined position with the tablet next to the one being removed in engagement with shoulder 35. In case the outer record tablet and the next adjacent record tablet stick together as the outer tablet is raised relative to the spindle by the posts 58 or 59, the shoulder 36 will engage the upper side of the wall of the center opening in the second tablet to prevent its removal from the spindle with the outer tablet.

The outer tablet is now freed from the magazine and is carried downwardly toward the turntable until the wall of the center opening in the record tablet engages the beveled side of the upper end of the turntable spindle. The weight of the tablet and the continued downward movement of the transfer hoop coact with the beveled turntable spindle to move the edge of said tablet clear of posts 58 and, as the upper edge of the transfer hoop passes below the upper surface of the turntable, the record tablet falls by gravity onto the turntable and into frictional engagement with the felt covering thereon.

After the record tablet has been reproduced, the stylus is automatically lifted from said tablet, and the tone arm and sound box are swung clear of the same in a manner to be described hereinafter. The record hoop is now swung upwardly by slide 66 to remove the reproduced tablet from the turntable and to discharge said tablet through opening 29 into a suitable receptacle.

Means are provided to prevent engagement of the edge of the record tablet being discharged with the members which project from the upper surface of arms 54, 54a, whereby said tablet will freely slide, under the action of gravity, from the inclined transfer hoop through the opening 29. To this end, there is provided a lift pad 72 which is pivotally mounted between the arms 54, 54a. In the form shown, the upper surface of the lift pad is arcuate in form and is covered with a layer of felt 73 to prevent scratching of the record. Pivot member 55, on which the hoop 53 is supported, extends through the lower portion of pad 72 adjacent one end thereof and constitutes a pivot member for the same.

Since the lift pad is eccentrically pivoted, it tends to assume a position with its lower surface resting on the transverse web 54b and its upper surface below the posts 58 and 59. Means are accordingly provided for holding the pad in raised position until after the record tablet has slid from the upwardly swinging hoop through opening 29, said means thereafter being automatically rendered ineffective to support the inner end of the lift pad, whereby said pad swings by gravity to a position below the posts, and this before the transfer hoop engages the next tablet to be removed from the magazine. In order to thus control the position of the lift pad, the same is provided with a downwardly projecting arm 74 carrying a pin 75 that is adapted to coact with a latch 76.

The latch, which is somewhat triangular in shape, is pivoted by a pin 77 to the bifurcated end of arm 54, member 77 being common to latch 76 and link 62. Latch 76 is also provided with a laterally projecting ear 78 to which is attached one end of a spring 79, the opposite end of the latter being secured at any convenient point, as to an ear projecting from the side of link 62. The upper edge of latch 76 is provided with a notch 80 into which pin 75 moves, as will be described hereinafter.

On the side of the lift pad opposite pin 75, the pad is provided with a recess, the inner end wall 82 thereof constituting a jaw adapted to coact with a pin 83 that projects from one of the posts 56.

When the hoop 53 is in normal horizontal position, the lift pad occupies the position shown in full lines in Fig. 5 with the upper surface of said pad above the upper ends of the posts 58 and 59, with pin 75 in engagement with notch 80, with spring 79 under tension, and with jaw 82 in engagement with pin 83. As the transfer hoop swings upwardly to discharge the reproduced tablet, spring 79 maintains the latch 76 in engagement with pin 75 and the outer end of said latch is swung downwardly by means of pin 77, whereby lift pad 73 is maintained above the surface of the record engaging posts. When the transfer hoop has moved upwardly a sufficient distance to free the record tablet from the turntable spindle, said tablet slides by gravity over the surface of the lift pad and into engagement with a felt-covered member 84 which projects upwardly from the side of opening 29 adjacent the magazine stand 30 and guides the tablet downwardly through said opening 29. Immediately thereafter, and as the transfer hoop 53 continues its upward movement, ear 78 reaches a position such that it engages the under edge of the link 62, as shown in dotted lines in Fig. 5, and in this position the entire tension on spring 79 is relieved. As the transfer hoop continues upwardly, the pin 75 moves away from the shoulder, and the weight of the upper end of pad 72 is such that it now swings downwardly by gravity into engagement with web 54b, the pin 75 riding over the shoulder of notch 80 (Fig. 6). Posts 58 and 59 are now free to engage and coact with hoop 53 in removing the next tablet from the magazine (see Fig. 8), the pad 72 being lowered clear of the posts 58 and 59 so that the posts can receive small and large size record tablets respectively.

As the transfer hoop swings downwardly carrying the lift pad therewith, pin 75 forces the inner end of latch 76 downwardly, placing the spring 79 under tension. This movement continues until the engagement of arm 82 with pin 83 prevents further downward movement of the lift pad. The continued movement of the hoop, however, acts on the latch 76 to swing it until the pin 75 moves into the notch 80, whereby spring 79 is again effective to support and retain the lift pad with its upper surface above the upper ends of posts 58 and 59.

*Receptacle for played record tablets (Figs. 1, 2 and 3).*—Means are provided for receiving the record tablets after they have been reproduced and removed from the turntable by the record transfer means. Preferably, the record tablet receptacle is constituted by a sliding drawer 85 positioned below the motorboard and immediately below opening 29 therein. The front side of drawer 85 is cut away as shown at 86 in Fig. 2, and the inner walls of the drawer are preferably covered with felt to prevent damage to the record tablets as they are delivered therein by the transfer means. After all of the record tablets have been reproduced and deposited in drawer 85, the latter may be pulled outwardly to permit removal of the tablets therein.

*Driving mechanism for the transfer means (Figs. 2, 3, 4, 7 and 8).*—Novel driving mechanism is provided for actuating slide 66, whereby the record tablet transfer member 53 is swung about pivot 55 to transfer record tablets to and from the turntable. This mechanism is automatically thrown into and out of operation at the appropriate times in a manner to be described hereafter.

The driving mechanism for the transfer means comprises a clutch wheel 87 (Fig. 2) which is drivably secured to the turntable spindle, as by means of a set screw 88. In frictional engagement with the upper surface of wheel 87 is the hub 23a of the turntable. If desired, a felt washer 89 may be interposed between the hub 23a and the upper surface of wheel 87 to prevent wear of the parts and to insure frictional engagement of the same, it being understood that the turntable is preferably driven by frictional engagement of its hub portion with the upper surface of wheel 87.

Formed integrally with the lower portion of wheel 87 or drivably connected thereto in any suitable manner is a ratchet wheel 90 which is adapted to be drivably engaged by a curved pawl 91 (Fig. 4) pivoted intermediate its ends, as at 92, to the upper surface of a disk-shaped carrier 93 that is drivably attached to and supported on the upper surface of a pinion 94 that surrounds spindle 22 above the motorplate 17, a suitable washer 95 preferably being interposed between the lower face of the pinion and the upper surface of said motor-plate. The pawl 91 is attached at its free end to a suitable spring 96, one end of the spring being anchored as at 97 to the upper surface of carrier or disk 93. Spring 96 tends to maintain pawl 91 in driving engagement with the ratchet wheel 90.

When the pawl 91 and ratchet 90 are in driving engagement, the motion of the turntable spindle 22 is transmitted to the disk 93, and therethrough to the pinion 94 which meshes with an intermediate spur gear 98 that is rotatably mounted on a stub shaft 99 which projects upwardly from motorplate 17. The gear 98 has drivably connected thereto a pinion 100 which meshes with the spur gear 71, whereby the latter is rotated and movement is imparted to link 68 to reciprocate slide 66. Reciprocation of slide 66 acts through ear 65, pins 64, and link 62 to swing the tablet transfer hoop upwardly about pivot 55.

*Sound box and tone arm control (Figs. 3, 4, 8 and 9).*—Novel means are provided for automatically moving the sound box and tone arm into operative engagement with the record tablet and, after reproduction of said tablet, said means are effective to elevate the sound box and tone arm, and swing and hold the same clear of the record tablet while said tablet is removed from the turntable and another tablet is placed thereon. Preferably, the mechanism for controlling the movements of the sound box and tone arm is actuated by slide 66, and the driving mechanism for the slide is automatically thrown into operation by a movement of the stylus and sound box. For example, a reverse movement may be imparted to the stylus and sound box by an eccentric groove formed in the tablet at the end of the sound groove, whereby driving engagement between pawl 91 and gear 90 is established, slide 66 is actuated, and the sound box control means are rendered operative. It is to be expressly understood, however, that the present invention is not limited to the use of an eccentric groove for controlling the operation of the driving mechanism since other control means will readily suggest themselves to those skilled in the art.

In order that the taper tube or tone arm may be moved in the manner above indicated, the same is pivotally mounted on a vertically disposed sound conduit section 101 (Fig. 9) that is rotatably mounted by ball bearings 102 in a cup-shaped support 103 carried on the lower face of motorplate 17. The large end of the tone arm is provided with a rigidly attached, tubular member 104 provided interiorly with a curved surface adapted to engage a somewhat spherical surface 105 formed on the upper, outer portion of conduit 101. Member 104 is pivotally connected in any convenient manner, as by means of trunnions 106, to the conduit 101, whereby said tone arm is adapted for pivotal movement relative to said conduit. A stop pin 107 may be provided on conduit 101 to limit the pivotal movement of the tone arm about trunnions 106.

Preferably, the pivotally mounted gooseneck 25a carries two projecting pins 108 and 109 adapted to coact with a stop 110 carried on the tone arm. When in the position shown in Fig. 9, movement of the gooseneck in an anti-clockwise direction, relative to the tone arm, is prevented by engagement of pin 108 with stop 110, and when the gooseneck is moved in a clockwise direction through 180° to facilitate the changing of the needle or stylus, pin 109 engages stop 110 and limits the movement of the gooseneck.

Surrounding the tubular member 104 and rigidly clamped thereto by a screw 111 is a yoke 112 provided with a downwardly extending arm 113 which carries on the free end thereof a vertically disposed post 114. The yoke 112 is also provided with two laterally projecting ears 115 (Fig. 4) adapted to coact with a stop pin 116 which projects upwardly from the motorplate into the path of movement of said ears to positively limit the swinging movement of the tone arm in both directions.

Post 114, which moves in unison with the tone arm as the latter is swung inwardly by engagement of the stylus with the sound groove of the record tablet, is provided with a pivoted pawl 117 adapted to coact with a serrated member or rack 118 carried on the outer end of a trip lever 119 that is pivoted as at 120 to a suitable post that projects upwardly from the motorplate 17. The inner end 121 of the trip lever is adapted to engage the free end of the pivoted pawl 91 and maintain said pawl out of driving engagement with gear 90. A spring 122, which is anchored in any suitable manner to the motorplate and which is attached to an ear 123 provided on the trip lever, normally maintains the inner end of said trip lever in the path of the pawl 91. Preferably, post 114 is provided with an elongated notch, and pawl 117 is pivoted to said post centrally of the notch. Pivotal movement of the pawl is limited by its engagement with the end walls of the notch.

When the stylus moves into the eccentric groove at the end of the sound groove, the tone arm, post 114 and pawl 117 are given a reverse movement, or a movement away from the center of the turntable. The pawl, which during the inward movement of the tone arm rides idly over the inclined teeth of rack 118, now positively engages said rack and swings lever 119 about its pivot 120 and against the tension of spring 122, thereby moving the beveled end 121 of the trip lever out of the path of pawl 91. Spring 96 now forces the pawl 91 into driving engagement with gear 90 and slide 66 is reciprocated through the train of gearing and the link 68 described above.

Means are provided for swinging the tone arm about its trunnions 106 to raise the stylus from the record and said means are actuated by the slide 66. For this purpose, there is provided a lifting arm 124 that is pivotally connected, as by means of upstanding ears 125, to a shaft 126 mounted on a pair of posts 127 that project upwardly from the motorplate.

As shown more clearly in Fig. 9, the end of slide 66 opposite ear 65 is beveled as at 128 to slide beneath and raise a correspondingly beveled roller 129 that is carried by and extends downwardly from arm 124. The free end of arm 124 projects underneath post 114 and is enlarged as at 130 to provide a bearing surface for said post.

Arm 124 is also provided with a downwardly projecting pin 131 adapted to engage the motorplate and limit downward movement of said arm about pivot 126.

When the slide 66 moves underneath roller 129, the arm acts through its enlarged portion 130 to raise post 114 and swing the tone arm upwardly about pivots 106. Since pin 108 on the gooseneck now engages stop 110 on the tone arm, the sound box 26 is also raised clear of the record. Simultaneously, pawl 117 is moved upwardly out of engagement with the rack 118 on trip lever 119.

Means are provided for swinging the tone arm and sound box outwardly, clear of the record tablet, while in raised position. As shown in Figs. 4 and 8, the slide 66 is provided with an L-shaped slot 132 and into this slot extends a pin 133 which projects downwardly from the lower face of a swinging arm 134 which is pivoted to the upper surface of the motorplate as at 135, the pivot being vertically disposed and the arm 134 being adapted to swing in a horizontal plane. As slide plate 66 is reciprocated, or as the same moves downwardly as viewed in Fig. 4, the engagement of pin 133 with the side walls of slot 132 results in arm 134 being swung in a clockwise direction so that the free end 134a of said arm engages the side of post 114 and swings arm 113, the tone arm and the sound box outwardly, clear of the turntable and record tablet.

Pivoted to arm 134 intermediate pin 133 and the free end 134a of said arm, is a tone arm return lever having a hook-shaped end 136 that is adapted to engage the post 114 to limit the outward swinging movement of the tone arm. The opposite end 137 of the return lever is adapted to engage a movable post 138, that may be adjusted in a manner to be described hereafter. A stationary post 139 projects upwardly from the motorplate into the path of arm 134. Movement of arm 134 by slide 66, in a clockwise direction, swings end 137 of the return lever into engagement with post 139, whereupon said lever is swung about its pivotal connection with arm 134 and the hook-shaped end 136 of said lever is moved into engagement with post 114 as shown in full lines in Fig. 8. As slide 66 continues its movement, the pin 133, due to the swinging movement of arm 134, moves into the long arm of the L-shaped slot 132, whereupon further movement of the slide is ineffective to swing the arm 134. The slide continues its movement, however, in order to complete the operation of the record tablet transfer hoop. As the slide 66 is returned to normal position, pin 133 engages the outer wall of the short arm of the L-shaped slot, whereupon the slide swings lever 134 in an anti-clockwise direction and the hook end 136 of the return lever acts on post 114 to swing the tone arm inwardly to starting position. The swinging movement of the tone arm continues until arm 137 of the return lever engages post 138, whereupon the movement of arm 134 results in the return lever being swung in a clockwise direction about its pivotal connection with said arm to move hook 136 out of engagement with post 114.

The tone arm is now freed from the return lever but is held in starting position and with the sound box slightly raised above the record tablet by the engagement of post 114 with the lift lever 124. Preferably, the pivotal axis of the tone arm is slightly inclined from the vertical so that the tendency of the tone arm is to swing inwardly towards the center of the turntable. This tendency is counteracted after arm 134 and hook 136 are disengaged from post 114 by the enlarged portion 130 of the lift lever, which portion is inclined upwardly toward the turntable as shown more clearly in Fig. 9. The tone arm is thus held in a position with the stylus above the smooth outer portion of the record.

As slide 66 continues its movement (upwardly, as viewed in Fig. 4), it slides from under roller 129. The lift arm 124 now moves downwardly by gravity to the position shown in full lines in Fig. 9, the movement of said lift arm being positively limited by engagement of pin 131 with the motorplate 17. At the same time that the lift arm moves downwardly the sound box moves in a similar manner to engage the stylus with the rotating record tablet, and the parts are preferably so adjusted that said stylus engages the smooth part of said tablet adjacent the periphery thereof. Since the pivotal axis of the tone arm is inclined, the stylus now moves by gravity into the beginning of the sound groove and the record tablet is reproduced in the usual manner.

As the slide 66 completes its movement, spur gear 71 has rotated to such a point that a pin 140 which projects downwardly from trip lever 119 moves under the action of spring 122 into a notch provided in the inner edge of a ring 71a that is secured to the upper surface of gear 71. The beveled end 121 of the trip lever is now in the path of pawl 91, and, as the latter rotates, the free end of the same engages said trip lever and the pawl is disengaged from the driving gear 90.

In order to prevent chattering of the pawl 91 as it moves out of engagement with the driving gear 90, there is preferably provided a clutch release lever 141 (Figs. 4 and 7) pivoted at 142 closely adjacent driving disk 93. One end of lever 141 carries a roller 143 which is adapted to engage a notch 144 formed in the periphery of disk 93, the roller being urged into said notch by means of a spring 145 at the time that the end 121 of trip lever 119 engages the free end of pawl 91. Lever 141 prevents disk 93 from being rotated in a counterclockwise direction, and the pawl 91 is thus positively and quickly moved out of mesh with gear 90 without any chattering of the teeth.

In order to maintain roller 143 out of frictional engagement with the periphery of disk 93 during the engagement of pawl 91 with the driving gear 90, the clutch release lever is provided with an arm 146 adapted to extend into a recess in the outer edge of ring 71a when roller 143 is in notch 144, but when the pawl 91 is in driving engagement with gear 90, the arm 146 of lever 141 moves out of the notch and has sliding engagement with the periphery of ring 71a, whereby roller 143 is positively held out of engagement with the periphery of said disk.

*Load equalizer for driving motor (Figs. 2 and 8).*—During the reproduction of the record tablet there is ordinarily no variation in the load on the driving motor but when the reproduction of the tablet is completed, it is necessary to actuate slide 66 to raise and swing the tone arm clear of the record and to raise the record tablet transfer means. It is therefore desirable to provide means whereby a constant load will be placed on the driving motor at all times to insure an even speed of rotation for the turntable spindle. For this purpose there is preferably attached to a suitable pin 147 (Fig. 8), that projects upwardly from one end of a recess 148a formed in the upper face of motorplate 17, one end of a coil spring 148. The opposite end of spring 148 is attached to a pin 149 which projects downwardly from the lower face of slide 66.

When the driving pawl 91 first engages the driving ratchet 90, the parts are in such position that spring 148 is under tension and this spring coacts with the motor to move the slide 66 (downwardly, as viewed in Fig. 4), whereby the tone arm is raised and swung clear of the record tablet, and the transfer hoop is raised to remove a tablet from the turntable and thereafter remove a tablet from the magazine. As the record hoop swings downwardly the slide 66 moves upwardly, as viewed in Fig. 4, and the weight of the record transfer means coacts with the motor to reduce the load on the latter. To counteract this reduction in the load the spring is now being placed under tension, due to the movement of slide 66. It will thus be seen that the load on motor 19 is maintained constant at all times.

*Index mechanism (Figs. 1, 3 and 4).*—The machine of the present invention preferably embodies novel means whereby it may be adjusted to play small size record tablets or large size tablets, or whereby the automatic mechanism may be rendered ineffective and the machine operated to reproduce one tablet at a time, the sound box being manually moved into and out of engagement with said tablet.

To this end, there is provided an index control lever 150 which is pivotally mounted on the upper end of a post 151 that extends through and is rotatably mounted in the motorplate. The control lever 150 comprises a portion which has substantially the form of a sector, and projecting laterally from this sector is an arm 152 provided with an upwardly inclined portion 153 which is adapted to engage the upwardly projecting end 117a of pawl 117 to swing the latter out of engagement with rack 118. The sector also carries the movable post 138 which is adapted to engage arm 137 of the return lever. The edge of the sector portion of the control lever is provided with a plurality of notches, for example, three, any one of which is adapted to be engaged by a locking pawl 154 that is pivotally mounted on the upper surface of the motorplate and is yieldingly held in engagement with the notched edge of lever 150 by means of a spring 155. Preferably, the stationary end of spring 155 is attached to a pin 156 that projects upwardly from the upper face of the motorplate through a slot 157 formed in the lever 150, whereby the pivotal movement of said lever is positively limited.

Means are provided for swinging the control lever 150 about the pivot member 151 to thereby adjust post 138 and arm 152. For this purpose, the lower end of shaft 151 has attached thereto, below the motorplate, a toothed sector 158 which is in mesh with a bevel gear 159 carried on one end of a shaft that is rotatably mounted in the free end of an arm 160, said arm being secured in any suitable manner to the bottom of the motorplate. The arm 160 also constitutes a bearing for a shaft 161 which extends outwardly through the front wall of the cabinet. The inner end of shaft 161 has drivably attached thereto a bevel gear 162 which meshes with a bevel gear 163 mounted on the adjacent end of the shaft which carries bevel gear 159. The outer end of shaft 161 carries a lever 164 provided with a pointer 165 adapted to move over graduations formed on a plate 166 attached in any suitable manner to the outer face of the cabinet.

If it is desired to employ the magazine mechanism of the machine to play a plurality of record tablets in succession, for example to play ten-inch tablets, the lever is moved to bring pointer 165 opposite the upper graduation on plate 166, as shown in Figs. 1 and 3. This movement of lever 164 is transmitted through the shaft and gearing described above to rotate the sound box control lever 150 to a point such that the latch 154 engages the lower or left hand notch of said lever as shown in Fig. 4. This movement of lever 150 moves the pin 138 to such a position that the jaw 136 of the return lever swings the tone arm inwardly to a position where the stylus is in position to engage the smooth portion near the periphery of the ten-inch record tablet before arm 137 engages pin 138 and disengages jaw 136 from post 114. In this position of adjustment, the laterally projecting portion 152 of lever 150 is clear of pawl 117 and this pawl acts on trip lever 119 in a manner described above.

If it is desired to play the larger size records, such for example as twelve-inch record tablets, the lever 164 is moved to bring pointer 165 opposite the middle graduation on plate 166. Latch 154 will now engage the center notch in lever 150 and the pin 138 is moved to a position such that jaw 136 is disengaged from post 114 when the tone arm has been moved inwardly a sufficient distance to permit the stylus to be lowered onto the outer smooth portion of a twelve-inch record tablet.

If it is desired to render all of the automatic mechanism ineffective, the lever 164 is moved to such a position that latch 154 engages the right hand notch in the sound box control lever 150. The post 138 is now moved to such a position that jaw 136 is always maintained out of engagement with post 114 and the projecting portion 152 of lever 150 is in such a position that, when the tone arm and post 114 move inwardly, the upwardly projecting arm 117a of the pawl 117 engages the inclined edge 153 of portion 152 and swings said pawl upwardly out of engagement with rack 118, whereby the pawl is ineffective to actuate release lever 119.

*Reject mechanism (Figs. 1, 3 and 4).*—In certain instances, it is desirable to discontinue the playing of a record tablet before the same is completed, and in other instances it may be desirable to entirely prevent the reproduction of a tablet that has been included in the number positioned on the magazine spindle. The machine of the present invention accordingly includes means for discontinuing the reproduction of a record tablet at any point and removing it from the turntable, or for removing a tablet from the turntable before any portion of it has been reproduced.

To this end there is provided a reject lever 167 (Figs. 3 and 4) which is pivotally mounted intermediate its ends on a post 168 that projects upwardly from the upper surface of the motorplate. The inner end of the reject lever projects over the free end of pawl 91 and is adapted to be moved into engagement with a pin 169 which projects upwardly from the beveled end 121 of trip lever 119. Normally, the inner end of the reject lever is maintained out of engagement with pin 169 as by means of a coil spring 170. A stop pin 171 which projects upwardly from the motorplate through an opening 172 formed in the outer arm of lever 167 limits the swinging movement of the latter. Attached in any suitable manner to the outer arm of the reject lever is a push member 173 which slidably extends through the wall of the cabinet and terminates at a short distance from the outer face of the plate 166.

When it is desired to discontinue the playing of any record tablet or to remove a tablet on the turntable without discontinuing the operation of the machine, the operator pushes the member 173 inwardly, whereupon the inner arm of reject lever 167 is moved to engage pin 169 and swing trip lever 119 out of engagement with pawl 91. Spring 170 returns the reject lever to normal position. Pawl 91 now engages ratchet 90 and the train of gearing and slide 66 are immediately set into operation. After the sound box and tone arm have been swung clear of the record tablet, the transfer hoop raises said tablet and it slides by gravity into the receptacle 85.

*Switch and stop mechanism (Figs. 1, 3 and 10 to 13 inclusive).*—The machine constituting the subject matter of the present invention embodies novel means for connecting and disconnecting the driving motor with a suitable power circuit, and preferably said means are so constituted that the machine will automatically discontinue its operation after the last record tablet has been reproduced and discharged into the receptacle 85.

In the form shown, there is positioned on the upper surface of the motorboard a switch plate 174 provided with an arcuate slot 175 through which extends a manually operable lever 176 for controlling the engagement and disengagement of a rotating contact arm 177 (Fig. 10b) with a pair of stationary contacts 178. The lever 176 is pivotally mounted at 179 on a plate 180 carried by a pivot member 181 that is rotatably supported by a plate 182 positioned below plate 174 and retained in parallel relation therewith by means of suitable bolts or posts 183. Projecting upwardly through an arcuate slot 184 in plate 180 and through an arcuate slot 185 in plate 182 is the upper arm 186 of an L-shaped member, the lower arm of said member having an opening through which pin 181 extends, and to which is attached the rotatable contacts 177. The pair of stationary contacts are preferably mounted in a cylindrical box 187 which is formed of insulating material and is attached to the lower face of plate 182, as by means of screws 188.

The plate 180 is provided with a pair of upwardly extending ears 189 and between these ears extends a portion of the lever 176, the latter being provided with an upstanding ear 190 to which is attached one end of a spring 191, the opposite end of said spring being secured to a post 192 that projects upwardly from plate 182. The lever 176 is also provided with an arm 193 adapted to engage the end of a latch arm 194 rigidly attached to a rock shaft 195 that is rotatably mounted in the upper and lower plates 174 and 182. Arm 194 is yieldingly held against a stop pin 196 which projects upwardly from the upper face of plate 182 by means of a coil spring 197 that may be attached at one end to said arm and at its opposite end to post 192.

When lever 176 is at the end of the slot 175 marked "Off" and it is desired to start the machine, lever 176 is swung to the end of the slot marked "On". This movement is transmitted by engagement of the lever with the left hand lug 189 to plate 180, whereby the latter is swung in a clockwise direction, and the plate in turn swings the L-shaped arm about pin 181 thereby moving rotatable contacts 177 into engagement with the stationary contacts 178. The lever 176 moving about the pivot constituted by pin 181 acts to place spring 191 under tension and when in the "on" position, spring 197 holds arm 194 in latching engagement with the end of arm 193 with the contacts 177 and 178 closed.

When it is desired to move lever 176 to "off" position to discontinue the operation of the machine, said lever is swung about pivot 179 until the same engages the right hand lug 189. This pivotal movement of lever 176 is sufficient to disengage arm 193 from arm 194, whereupon spring 191 swings the lever and plate 180 about pivot 181, thereby moving the L-shaped arm and rotating contacts 177 out of engagement with contacts 178. Preferably, the lower plate 182 carries an upstanding ear 198 adapted to be engaged by an ear 199 on the plate 180, whereby the pivotal movement of said plate in an anti-clockwise direction is positively limited.

In order that the switch may be automatically thrown to discontinue the operation of the machine after the last record tablet in the magazine has been reproduced and discharged into receptacle 85, the transfer hoop 53 is provided with a trip lever 200 which is pivotally secured to the outer face of said hoop, as by means of a pin 201. The left hand end of lever 200, as viewed in Fig. 10, is heavier than the right hand end, whereby the trip lever normally tends to assume a vertical position relative to the transfer hoop. Preferably, the trip lever is provided on its lower edge with a lug 202 adapted to engage a pin 203 which projects from the side of the hoop and limits the pivotal movement of the trip lever in an anti-clockwise direction. The heavy end of the trip lever is provided with an adjustable screw 204 and the light end of said lever is elongated and is adapted to swing upwardly, under the action of gravity, into engagement with the lower surface of a record tablet on the transfer hoop (dotted line position, Fig. 12).

In the event that the record hoop is returned to normal horizontal position without a record thereon, the upward movement of the light end of the trip lever is unimpeded and said trip lever assumes an inclined position with lug 202 in engagement with pin 203 (full line position, Fig. 12). As the hoop continues its downward swinging movement, the heavy end of the trip lever moves into engagement with an upwardly extending tongue 205, which may be pressed from the plate 174, whereby said lever is swung in a clockwise direction about pivot 201. Screw 204 is so adjusted that it now moves into engagement with a latch trip 206 (Fig. 13) which is rigidly attached to the upper end of rock shaft 195. At the time of engagement of screw 204 with the free end of the latch trip, the movement of the hoop is effective to impart, through the trip lever, a swinging movement to said latch trip about the vertical axis constituted by the rock shaft 195, whereby arm 194 is swung out of engagement with arm 193 of lever 176. Spring 191 is now effective to move contacts 177 out of engagement with contacts 178 in a manner described above. As the hoop reaches its normal horizontal position, tongue 205 holds the heavy end of the trip lever upwardly out of engagement with latch trip 206 (Fig. 11).

In the event that the transfer hoop is moved downwardly with a record thereon, the engagement of the light end of the trip lever 200 with the lower surface of the record holds the adjustable screw 204 in such a position that it cannot engage the latch trip 206, and accordingly the machine continues its operation.

*Operation.*—Assuming that the machine has been automatically stopped, in the manner indicated above, after all of the record tablets originally supported on the magazine have been reproduced, and it is desired to again play a series of tablets, a selection of ten-inch record tablets, for example, is made and these are placed on the magazine by means of the loader. Preferably, one record tablet is placed on the turntable. Lever 164 is now moved to bring pointer 165 opposite the graduation marked "10 inch" on plate 166, and the starting switch lever 176 is manually moved to "on" position, whereupon the motor is rendered effective to actuate the tone arm control means and move the stylus into engagement with the smooth edge of the record on the turntable. The stylus thereafter moves by gravity, due to the inclination of the axis of the tone arm, into the beginning of the sound groove of the record tablet, whereupon the tablet is reproduced.

As soon as the stylus is lowered onto the smooth edge of the tablet, the trip lever 119 moves into the path of pawl 91 to disconnect the disk 93 from driving engagement with the turntable spindle. The motor is now effective to drive the turntable and record tablet only, the other parts of the mechanism remaining at rest.

As the stylus moves into the eccentric groove adjacent the center of the record, the tone arm and the post 114 carried thereby are given a reverse movement, whereupon the pawl 117 is effective to move trip lever 119 out of engagement with pawl 91, whereupon the spring 96 forces said pawl 91 into driving engagement with gear 90 and slide 66 is reciprocated. After the tone arm has been raised and swung clear of the record, the transfer hoop is swung upwardly to discharge the reproduced tablet, to remove a tablet from the magazine and to deposit the same on the turntable.

The above cycle of operations is automatically repeated until all of the record tablets have been reproduced and discharged into the receptacle 85, whereupon the machine is automatically stopped. In the event that no record is placed on the turntable in starting up the machine after placing a series of records in the magazine, the tone arm should be moved towards the turntable spindle by hand and then manually given a reverse movement to disengage the trip lever 119 from driving pawl 91, whereupon the mechanism for actuating the transfer hoop will be placed in operation, and the latter will deposit a tablet on the turntable.

In the event it is desired to play twelve-inch record tablets, the index mechanism is adjusted for twelve-inch tablets before moving switch lever 176 to "on" position. In the event that it is desired to reproduce tablets one at a time, the lever 164 is adjusted to bring its pointer 165 opposite the lower graduation on plate 166, whereby the pawl 117 is rendered ineffective to release lever 119. The transfer and tone arm control mechanisms accordingly are never thrown into operation and the machine is operated as if it were not provided with automatic mechanism. The reject mechanism may be actuated at any time after the stylus is in engagement with the record tablet to throw the tone arm and transfer control mechanisms into operation and thus immediately and automatically remove the tablet on the turntable and replace it with the next record on the magazine.

In the embodiment of the invention shown in Fig. 14, the magazine machine embodies means for electrically reproducing record tablets. In the form shown, an electrical reproducer or pick-up device 207 is pivotally mounted at a suitable point on the tone arm 25. For this purpose, the tone arm is provided with a pivot member 208 which carries an arm 209, the pick-up device being mounted on the free end of said arm. The device may be of any suitable type and hence does not require a detailed description, it being only necessary to point out that it is operatively connected to an amplifier or loud speaker of any suitable type (not shown) which may be mounted in the cabinet 14 or at any convenient point outside of the cabinet. Arm 209 is so formed and is pivotally connected to the tone arm in such a position that, when the electrical reproducer is lowered into engagement with the record tablet after the mechanical reproducer 26 has been raised to inoperative position, the stylus 210 carried by said electrical reproducer will engage the same sound groove in the record tablet as that engaged by the stylus 27 of the mechanical sound box. A stop 211 is provided on the pivot member 208 for engagement with shoulders 212 or 213 formed on the arm 209, whereby relative movement of the reproducer 207 in both directions is positively limited with respect to the tone arm. In view of this arrangement, it will be apparent that the means previously described for controlling the movement of the sound box 26 and tone arm 25 functions in the same manner and as effectively when the pick-up device 207 is in operative engagement with a record tablet as when the mechanical reproducer 26 is in operative engagement therewith. When electrically reproducing record tablets, therefore, the machine automatically operates in other respects as has been fully described above.

There is thus provided a novel sound reproducing machine which is adapted to automatically reproduce a plurality of record tablets in succession.

The mechanism is extremely compact and may be placed in a cabinet provided with a lid of the usual size, since, when the machine is not in use, the magazine may be lowered to a position substantially parallel with the turntable. The magazine mechanism is simple in construction and may be readily made to support a large number of record tablets in operating position for transfer to the turntable. The loader greatly facilitates the placing of the record tablets on the magazine.

The posts 58 and 59 may be integrally formed or suitably attached to the transfer hoop in any suitable manner and no mechanism is required for retracting or projecting these posts above the surface of the transfer hoop. The lift pad insures that the tablet to be removed will not engage these posts, as the same slides downwardly by gravity into receptacle 85.

The tone arm control mechanism is positive in action and permits adjustment of the machine for different size tablets, the parts being so arranged as to enable the machine to be used in reproducing tablets one at a time. Spring 148 is operatively connected to the slide 66 in such a manner that a constant load is maintained on the driving motor at all times, thereby facilitating the speed control of the motor so that speed regulating mechanism of the usual or any suitable type may be satisfactorily employed.

The index and reject mechanisms are controlled by manually operable elements that are preferably mounted on a side panel of the cabinet. The switch and stop mechanism are so constituted that there is no possibility for the stylus to be lowered into engagement with the felt covered surface of the rotating turntable, since, if a record tablet is not placed on the turntable by the transfer hoop, the machine is automatically stopped. The control means for the tone arm and transfer mechanism are so constituted that they may be mounted in a small space immediately below the motorboard and are readily accessible for repair or replacement of parts.

The electrical reproducer may be conveniently mounted on the tone arm without interfering with the operation of the mechanical reproducer. Since the electrical reproducer is limited in its movement relative to the tone arm and since it is so mounted that the stylus carried thereby will engage the same groove in the record tablet as that engaged by stylus 27 of the sound box, the tone arm control mechanism requires no adjustment when it is desired to reproduce tablets electrically. The loud speaker may be of any suitable type and may be mounted either in the lower part of the cabinet or in a separate cabinet, as desired.

Only two embodiments of the invention have been illustrated in the accompanying drawings, but is to be expressly understood that the drawings are not designed as a definition of the limits of the invention, since various changes may be made in the details of construction and in the arrangement of the parts. For example, various types of driving motors may be employed and the invention is not necessarily limited to the use of an electric motor. Reference will therefore be had to the appended claims for a definition of the limits of the invention.

What is claimed is:—

1. In a sound reproducing machine of the type embodying a turntable rotatably mounted above a motorboard, a magazine for supporting a plurality of record tablets comprising a stand pivoted to said motorboard, a spindle pivoted to said stand and having a portion adapted to extend through the center holes in said tablets, and a latch pivoted to said stand for maintaining the spindle and stand in an inclined position.

2. In a sound reproducing machine of the type embodying a turntable rotatably mounted above a motorboard, a magazine for supporting a plurality of record tablets comprising a stand pivoted to said board, a spindle mounted on the upper end of said stand, said spindle having a portion adapted to extend through the center holes in said tablets, means for maintaining said stand in an inclined position, and a tilting lever pivoted to said stand, the free end of said lever being adapted to engage a tablet mounted on the spindle and maintain said tablet in a plane substantially at right angles to the spindle.

3. In a sound reproduction machine, a magazine for supporting a plurality of record tablets comprising a stand, a spindle carried by said stand and adapted to extend through the center holes in said tablets, and a member pivoted to the stand below said spindle and extending upwardly above said spindle to engage the adjacent face of a tablet mounted on the latter.

4. A magazine for sound reproducing machines comprising a stand, a spindle carried by the stand and adapted to extend through the center holes of a plurality of record tablets, a tilting lever pivoted to the stand and extending above said spindle, and a roller carried by the upper end of said lever and normally having engagement with the adjacent face of a tablet mounted on the spindle.

5. In a talking machine of the type embodying a turntable, magazine means for supporting a plurality of record tablets, and means for transferring said tablets from the magazine to the turntable, said magazine means comprising a stand, a nearly horizontal spindle attached to the stand and adapted to extend through the center holes in said tablets, means movably mounted on the stand for engagement with one of the tablets on the spindle whereby said tablets are yieldingly maintained in a position substantially at right angles to said spindle, and a stop for limiting the movement of said means relative to said stand.

6. In a sound reproducing machine, a magazine for record tablets embodying a stand and a spindle carried by the stand, said spindle being adapted to extend through the center holes in the tablets and having adjacent one end thereof a hook, and a member for loading tablets on said spindle comprising a handle portion and a spindle provided with an eye, said eye being adapted for engagement with the hook on said first named spindle.

7. A loader for placing a plurality of record tablets on a magazine, said loader comprising a member having a handle portion, a spindle secured to the handle portion and provided with an eye on the free end thereof, and means intermediate said spindle and handle for supporting record tablets threaded over said spindle.

8. In a talking machine embodying sound reproducing instrumentalities, a magazine for supporting a plurality of record tablets, and transfer means for moving said tablets one at a time into operative relation with said sound reproducing instrumentalities, said transfer means comprising a lift ring, a pair of members projecting upwardly from the upper surface of said ring and adapted to engage and lift a record from said magazine, said members being stationary relative to said lift ring, and means for swinging said lift ring into and out of operative engagement with tablets carried by said magazine.

9. In a magazine talking machine embodying a turntable, a magazine, and a receptacle below said magazine, transfer means for moving a record tablet from said magazine to said turntable and for discharging said tablet into said receptacle, said transfer means comprising a lift ring, two pairs of members rigidly secured to and extending upwardly from said lift ring, one pair of said members being adapted to engage the periphery of small size tablets carried by said magazine, the other pair of said members being adapted to engage the peripheries of large size tablets carried by said magazine, and means for swinging said lift ring from a substantially horizontal position upwardly into engagement with tablets supported on said magazine.

10. In a sound reproducing machine, the combination of sound reproducing instrumentalities, a magazine for supporting a plurality of record tablets, means for transferring record tablets in succession from said magazine into operative engagement with the sound reproducing instrumentalities, and means for disengaging a record tablet from said transfer means, said last named means comprising a pad, and means for maintaining said pad above the upper surface of the transfer means when said transfer means is in its rest position.

11. In a sound reproducing machine, a magazine embodying a spindle for supporting a plurality of record tablets, sound reproducing instrumentalities, a pivotally mounted transfer hoop, and means for swinging said hoop to move a tablet from the magazine spindle into cooperative relation with the sound instrumentalities, said means comprising a slide operatively connected to said hoop, yielding means connected to said slide for resisting movement of the slide in one direction, and means for actuating said slide.

12. In a sound reproducing machine, a magazine for record tablets, sound reproducing instrumentalities, a hoop for moving the tablets from the magazine into cooperative relation with said instrumentalities, a pivot member for said hoop, a lift pad on said pivot member, and means for swinging said hoop and lift pad about said pivot member.

13. In a magazine talking machine, a tablet transfer hoop having record engaging members projecting therefrom, a lift pad for holding a tablet above said engaging members, means for actuating said hoop, and yielding means for moving said pad in unison with said hoop throughout a portion of the movement of the latter.

14. In a magazine talking machine, tablet transfer means including a transfer hoop, means for swinging said hoop, an eccentrically mounted lift pad operatively connected to said hoop, and means for swinging said pad in unison with said hoop.

15. In a magazine talking machine, a record tablet transfer member, and means for actuating said transfer member comprising a slide operatively connected to said transfer member, power means, a train of gearing, clutch means interposed between said gearing and power means, and a link operatively connected to said slide and eccentrically connected to one element of said gear train.

16. In a sound reproducing machine, a tone arm, a gooseneck pivoted to the tone arm, means for limiting the pivotal movement of the gooseneck relative to the tone arm, means mounting said tone arm for pivotal movement in horizontal and vertical planes, means for raising and swinging said tone arm including a reciprocating slide, means for actuating said slide, and yielding means for resisting movement of the slide in one direction.

17. In a sound reproducing machine, sound reproducing instrumentalities, means for moving record tablets into and out of operative engagement with said instrumentalities, means for moving said instrumentalities out of engagement with a record tablet, means for actuating said first and second named means including power means, and means for maintaining a constant load on said power means.

18. In a sound reproducing machine, a driving motor, variable load means including tablet transfer means adapted to be driven by said motor, and means operatively connected to said transfer means for maintaining a constant load on said motor.

19. In a sound reproducing machine, a turntable, tablet transfer means, tone arm control means, a motor for actuating said turntable, transfer means and control means, and yielding means for maintaining a constant load on said motor.

20. In a sound reproducing machine, a driving motor, means including movable parts of the machine constituting a variable load adapted to be driven by said motor, and yielding means for maintaining a constant load on said motor.

21. In a sound reproducing machine of the type embodying a tone arm, driving means, control means actuated by the driving means for moving said tone arm out of engagement with the record tablet comprising a post carried by the tone arm, a pawl pivoted to said post, a lift lever for the post, a lever pivoted independently of said lift lever for engaging the post and swinging the tone arm in a horizontal plane, a jaw member carried by said second named lever, a trip member engaged by said pawl for controlling the driving connection between the driving means and control means, and index mechanism comprising a rotatably mounted sector carrying a post for controlling the operation of said jaw.

22. In a sound reproducing machine of the type embodying a turntable and a tone arm, control means for moving said tone arm toward and away from a record tablet on said turntable, and index mechanism for adjusting the control means whereby the movement of the tone arm towards the tablet may be varied, said index mechanism comprising a rotatably mounted sector, a post carried thereby, and means for varying the adjustment of said sector.

23. In a sound reproducing machine of the type embodying a turntable and a tone arm, driving means, control means actuated by the driving means for moving said tone arm toward a record tablet on said turntable, and index mechanism for varying the extent of movement of said tone arm under the action of said control means, said index mechanism comprising a rotatably mounted sector carrying a post, means for adjusting the position of said sector, and means for yieldingly maintaining said sector and post in adjusted position.

24. In a sound reproducing machine of the type embodying a tone arm, control means for the tone arm including a pawl pivotally connected to the latter, and means for rendering the control means ineffective, said last named means including a rotatably mounted member, and means for moving the latter in the path of movement of the pawl whereby said pawl may be maintained in inoperative position.

25. In a sound reproducing machine, a magazine for supporting a plurality of record tablets, means for reproducing said tablets in succession including a transfer hoop and stop means for discontinuing the operation of the machine after all the tablets originally on the magazine have been reproduced, said stop means including a member pivoted on said transfer hoop and switch means adapted to be actuated by the member pivoted on the hoop.

26. In a machine of the class described, a tablet transfer member, driving means for said transfer member, switch means for controlling the operation of the driving means, and a trip lever carried by said transfer means for actuating said switch means.

27. In a sound reproducing machine, a driving motor, and switch means for controlling the operation of said motor, said switch means comprising a pair of movable contacts, a pivotally mounted plate for moving said contacts, a lever pivoted to said plate, resilient means operatively connected to said lever, and a latch arm engaging said lever and holding it against the tension of said resilient means.

28. In a sound reproducing machine, a driving motor therefor and switch mechanism for controlling the operation of said motor, said mechanism comprising a pair of contacts, a pivotally mounted plate operatively connected to said contacts, a lever pivoted to said plate, means for limiting the pivotal movement of said lever relative to said plate, yielding means for moving said plate and lever in unison, and a latch lever adapted to engage said pivotal lever to hold said plate and contacts against movement.

29. In a sound reproducing machine, a driving motor, a tablet transfer member adapted to be actuated by said driving motor, a trip lever carried by said transfer member, switch mechanism for controlling the operation of said motor, and a latch trip operatively connected to said switch mechanism and adapted to be actuated by said trip lever.

30. In a sound reproducing machine, a magazine, a turntable, a member for transferring record tablets from the magazine to the turntable, a trip lever carried by said transfer member, and switch mechanism adapted to be actuated by said trip lever, said lever being adapted to engage a tablet supported on said transfer member, whereby said lever is rendered ineffective to actuate said switch mechanism.

31. In a sound reproducing machine, a driving motor, a tablet transfer member adapted to be actuated by said motor, a switch for controlling the operation of said motor, said switch including a switch plate having a tongue carried thereby and a latch trip movably mounted on said plate, and a trip lever carried by the transfer member and movable into engagement with said tongue and latch trip.

32. In a sound reproducing machine of the magazine type, record transfer means comprising a pivoted transfer member, a plurality of elements carried by said member and adapted for engagement with the edge of a small size record tablet, a plurality of elements carried by said member and adapted for engagement with the edge of a large size record, said elements being rigidly attached to said transfer member, means for swinging the transfer member whereby a tablet thereon will be discharged by gravity from the member, and means movable with said member for preventing engagement between the tablet and said elements when said transfer member is in inclined discharging position.

33. In a sound reproducing machine embodying a turntable, sound reproducing instrumentalities, means for moving the sound reproducing instrumentalities to starting position and manually operable means for varying the movement of the sound reproducing instrumentalities to play record tablets of different diameters, said manual means comprising a rotatably mounted sector, a pin carried thereby, yielding means for maintaining said sector in adjusted position and a stop for positively limiting the movement of said sector, said yielding means being connected to said stop.

RUDOLF EJNAR ZERUNEITH.